US012600267B2

(12) United States Patent
Mo

(10) Patent No.: US 12,600,267 B2
(45) Date of Patent: Apr. 14, 2026

(54) INDICATING MECHANISM, SUPPORTING LEG HAVING INDICATING MECHANISM, AND CARRIER HAVING SUPPORTING LEG

(71) Applicant: Wonderland Switzerland AG, Steinhausen (CH)

(72) Inventor: Xiaolong Mo, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 124 days.

(21) Appl. No.: 18/569,026

(22) PCT Filed: Oct. 19, 2022

(86) PCT No.: PCT/EP2022/079119
§ 371 (c)(1),
(2) Date: Dec. 11, 2023

(87) PCT Pub. No.: WO2023/067012
PCT Pub. Date: Apr. 27, 2023

(65) Prior Publication Data
US 2024/0270127 A1 Aug. 15, 2024

(30) Foreign Application Priority Data
Oct. 19, 2021 (CN) .......................... 202111217067.7

(51) Int. Cl.
*B60N 2/02* (2006.01)
*B60N 2/28* (2006.01)
(52) U.S. Cl.
CPC ......... *B60N 2/0272* (2023.08); *B60N 2/2824* (2013.01)
(58) Field of Classification Search
CPC ... B60N 2/2824; B60N 2/2821; B60N 2/0272
See application file for complete search history.

(56) References Cited

U.S. PATENT DOCUMENTS 11,097,639 B2 * 8/2021 Harmes, V ............ B60N 2/929
2014/0327281 A1 11/2014 Hou et al.
2019/0359092 A1 11/2019 Harmes et al.

FOREIGN PATENT DOCUMENTS

CN 101687471 B 10/2011
CN 103042953 A 4/2013
(Continued)

OTHER PUBLICATIONS

CN 1st Office Action with English Translation; Application No. 202111217067.7; Date Mailed: May 24, 2024; pp. 1-16.
(Continued)

*Primary Examiner* — Milton Nelson, Jr.
(74) *Attorney, Agent, or Firm* — CANTOR COLBURN LLP

(57) ABSTRACT

An indicating mechanism is configured to indicate whether a component contacts with a surface, and the component has an indicating end and a contacting end that are opposite to each other. The indicating mechanism is installed on the component and includes: an indicator disposed at the indicating end and movable between a first position and a second position to indicate whether the component contacts with the surface; a driver movably disposed in the contacting end; a cable sleeve including a first end fixed to the indicating end and a second end fixed to the driver; a cable movably arranged in the cable sleeve, and including a first end and a second end extending out of both ends of the cable sleeve, wherein the first end is fixed to the indicator and drives the indicator to move, and the second end is fixed to the contacting end.

19 Claims, 11 Drawing Sheets

(56) References Cited

FOREIGN PATENT DOCUMENTS

| CN | 109398174 A | | 3/2019 | |
|----|-------------|---|--------|--|
| CN | 110525293 A | | 12/2019 | |
| CN | 210502383 U | | 5/2020 | |
| CN | 111251956 A | | 6/2020 | |
| CN | 107791904 B | * | 7/2024 | ........... B60N 2/2887 |
| DE | 202013103189 U1 | | 11/2013 | |
| EP | 1087096 A1 | | 3/2001 | |
| EP | 2720903 B1 | | 9/2015 | |
| GB | 1514092 A | | 6/1978 | |
| GB | 9405940 | | 5/1994 | |
| GB | 2287682 A | | 9/1995 | |
| GB | 201206102 | | 5/2012 | |
| JP | 2015117020 A | | 6/2015 | |
| JP | 2018526282 A | | 9/2018 | |
| JP | 2023547387 A | | 11/2023 | |
| TW | 258116 U | | 9/1995 | |
| TW | 585058 U | | 4/2004 | |
| TW | I348428 B | | 9/2011 | |
| WO | WO-2012172001 A | * | 12/2012 | ........... B60N 2/2821 |

OTHER PUBLICATIONS

Taiwanese Application No. 113135087; First Office Action w English Translation dated Jan. 23, 2025; pp. 1-16.

PCT International Search Report & Written Opinion; International Application No. PCT/EP2022/079119; International Filing Date: Oct. 19, 2022; Date Mailed: Feb. 20, 2023; pp. 1-7.

Taiwanese Application No. 111139673; First Office Action dated Sep. 5, 2023; 4 pages.

JP 1st Office Action with English Translation; Application No. 2024-523534; Date Mailed: May 27, 2025; pp. 1-6.

JP Search Report with English Translation; Application No. 2024-523534; Date Mailed: May 22, 2025; pp. 1-18.

* cited by examiner

INDICATING MECHANISM, SUPPORTING LEG HAVING INDICATING MECHANISM, AND CARRIER HAVING SUPPORTING LEG

CROSS-REFERENCE TO RELATED APPLICATIONS

The present application is a national phase application under 35 U.S.C. 371 of International Application No. PCT/EP2022/079119 filed on Oct. 19, 2022, and claims priority to Chinese application No. 202111217067.7 filed Oct. 19, 2021, the entire contents of which are incorporated herein by reference.

TECHNICAL FIELD

The present disclosure relates to an indicating mechanism, a supporting leg having the indicating mechanism, and a carrier having the supporting leg.

BACKGROUND

Generally, a child safety seat is provided with a supporting leg in front of the seat. One end of the supporting leg is fixed to a base of the child safety seat, and the other end of the supporting leg is supported on a floor of the vehicle, so that the child safety seat is more stably installed. However, if the supporting leg fails to stably contact with the ground, the child safety seat may have a risk of being overturned. Therefore, during use of the supporting leg, it is necessary to ensure the grounding of the supporting leg.

The supporting leg currently on the market may be retractable and folded with respect to the base, however, a retractable mechanism of the supporting leg cannot indicate whether the supporting leg is placed securely, causing a potential safety hazard of being misused under the condition that the supporting leg is not completely extended and does not stably contact with the ground.

SUMMARY

The present disclosure provides a novel grounding indicating mechanism for a supporting leg, which is simple in overall mechanism, and can provide a grounding indication for the supporting leg and/or an indication that the supporting leg completely extends out of the base, so as to avoid various potential risks caused by improper operation of users.

According to the present disclosure, an indicating mechanism for indicating whether a component contacts with a surface is provided. The component has an indicating end and a contacting end that are vertically opposite to each other, and the indicating mechanism is installed on the component. The indicating mechanism includes an indicator arranged at the indicating end and movable between a first position and a second position to indicate whether the component contacts with the surface; a driver movably disposed in the contacting end; a cable sleeve including a first end fixed to the indicating end and a second end fixed to the driver; a cable movably arranged in the cable sleeve, and including a first end and a second end extending out of both ends of the cable sleeve, wherein the first end of the cable is fixed to the indicator and may drive the indicator to move, and the second end of the cable is fixed to the contacting end; wherein, when the component contacts with the surface, the driver drives the second end of the cable sleeve away from the contacting end, so that the cable moves towards the contacting end with respect to the cable sleeve, and then drives the indicator to move.

BRIEF DESCRIPTION OF THE DRAWINGS

Embodiments of the present disclosure will be described in detail below with reference to the accompanying drawings, in which.

LIST OF REFERENCE NUMBERS

100 Supporting Leg
  101 Upper Tube
  102 Lower Tube
    110 Indicator
      111 First Area
      112 Second Area
      113 First Accommodating Part
      114 Movable Shaft
    120 Mount
    130 Driver
      131 Contacting Part
      132 Hole
      133 Second Accommodating Part
    135 Shoulder
    140 Fixing Seat
      141 Column
      142 Third Accommodating Part
    150 Cable
      151 First End of Cable
      152 Second End of Cable 155 Cable Sleeve
   156 First End of Cable Sleeve
   157 Second End of Cable Sleeve
160 Cover
   165 Cover Indicating Part
166 Hollow Part or Transparent Window
   170 Bracket
     171 Sliding Mechanism
     175 Supporting Leg Rotating Shaft
   182 First Elastic Element
   181 First Screw
   183 Second Elastic Element
   184 Second Screw
200 Carrier
   210 Base
   220 Seat

DETAILED DESCRIPTION

Although the present disclosure has been illustrated and described with reference to specific embodiments, the present disclosure should not be limited to the details shown. Exactly, many modifications can be made to these details within the scope of the equivalents of the claims without departing from the present disclosure.

The description of directions such as "front", "rear", "up", and "down" mentioned in the text is only for convenience of understanding. The present disclosure is not limited to these directions, but can be adjusted according to the actual situation.

Figure 1:
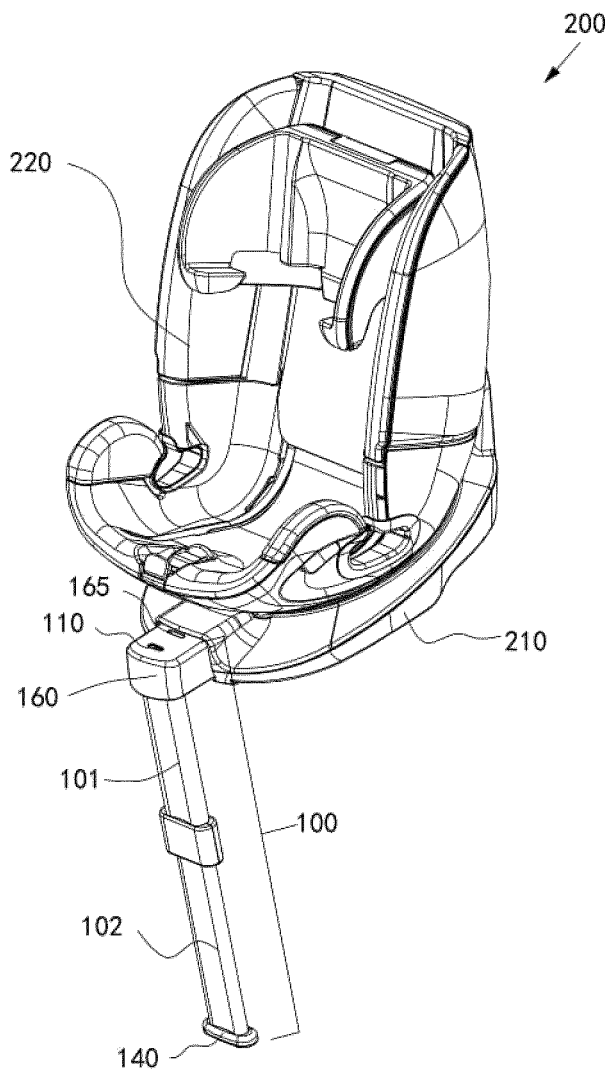
FIG. 1 is a perspective view of a child safety seat according to the present disclosure, in which a supporting leg is completely extended out of a base.
Figure 2:
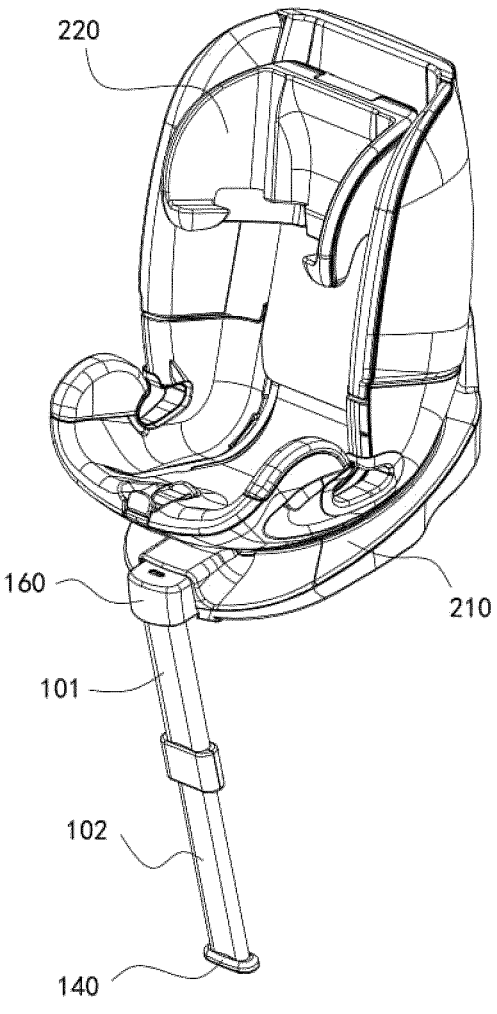
FIG. 2 is a perspective view of the child safety seat according to the present disclosure, in which the supporting leg is not completely extended out of the base.
Figure 3:
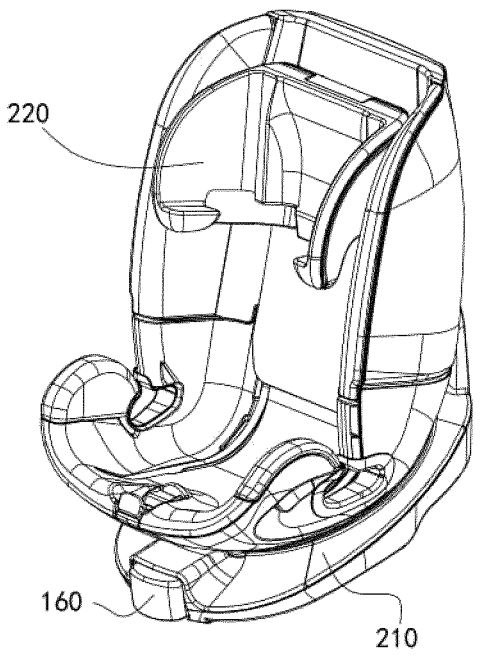
FIG. 3 is a perspective view of the child safety seat according to the present disclosure, in which the supporting leg is received under the base.

Please refer to FIGS. 1-3. In the embodiment of the present disclosure, the carrier 200 is a child safety seat, but it is not limited thereto. The present disclosure is applicable to any carrier 200 in which a supporting leg 100 is required.

As shown, the carrier 200 includes a base 210 and a seat 220. The base 210 is a part for fixing the carrier 200 to a vehicle seat, and the seat 220 is a part for carrying an occupant (i.e., a child). The supporting leg 100 are installed under the base 210, more specifically on a front side under the base 210, and configured to support the base 210 to a floor of a vehicle, so as to prevent the child safety seat from being overturned forward when the vehicle bumps.

In one embodiment, the supporting leg 100 is connected to the base 210 by a retractable bracket 170 (see FIG. 5), so that it is movable in a longitudinal direction (i.e., a front-back direction) with respect to the base 210, so as to extend out of the base 210 or retract into a position under the base 210. It should be understood that the supporting leg 100 can be directly connected to the base 210.

A cover 160 covers an upper part of the supporting leg 100, and a cover indicating part 165 is provided on a top surface of the cover 160, so that the user can observe whether the supporting leg 100 is completely extended out of the base 210. The cover indicating part 165 is provided at a rear end of the cover 160, and when the cover 160 is completely extended, the cover indicating part 165 will move out of the base 210. The cover indicating part 165 has a color that is easy to be observed, such as green or another color that have a strong contrast with that of the supporting leg 100, so as to attract the attention of a user.

In a state as shown in FIG. 1, the supporting leg 100 is completely extended out of the base 210, and the cover indicating part 165 is visible. In a state as shown in FIG. 2, the supporting leg 100 is not completely extended out of the base 210, and the cover indicating part 165 is not visible.

A hollow part or a transparent window 166 can be provided at a front end of the cover 160 (see FIG. 4), so that the user can observe an indicator 110 provided on the supporting leg 100. The indicator 110 is configured to indicate whether a bottom end of the supporting leg 100 is grounded, and the structure and principle thereof will be described in detail below. It should be noted that, "grounded" means that a component such as the supporting leg 100 is in contact with the ground and stably supported on the ground.

In one embodiment, a length of the supporting leg 100 can be adjusted. Specifically, the supporting leg 100 includes an upper tube 101 having an indicating end and a lower tube 102 having a contacting end. The upper tube 101 of the supporting leg 100 is sleeved on the lower tube 102 of the supporting leg 100, and they have corresponding positioning devices (e.g., clamps or pins) to allow the overall length of the supporting leg 100 to be adjusted.

The upper end of the supporting leg 100 (referred to as the indicating end) is connected to the bracket 170 (or directly connected to the base 210 in an embodiment without the bracket 170). The lower end of the supporting leg 100 (referred to as the contacting end) is used to contact with the ground. In one embodiment, a fixing seat 140 can be provided at the contacting end to facilitate the assembly of the indicating mechanism of the present disclosure. In other embodiments, the fixing seat 140 can be integrated into the supporting leg 100 and formed with the supporting leg 100 as an integral part.

In one embodiment, the supporting leg 100 can be integrally rotated to a position under the base 210 with the indicating end as a rotating shaft, as shown in FIG. 3. In this way, the supporting leg 100 can be completely folded into the base 210, so as to facilitate the transportation of the carrier 200.

Figure 4:
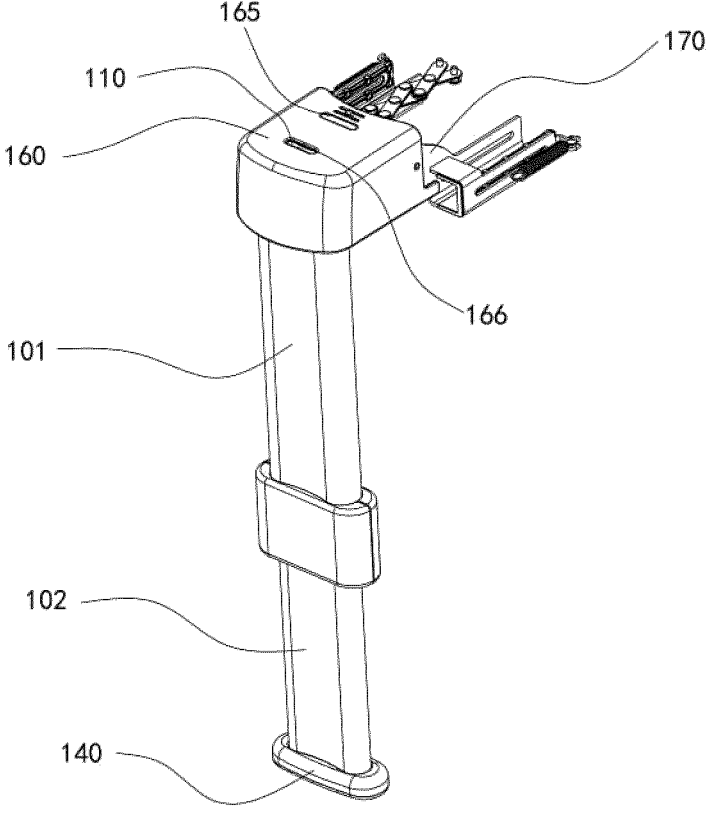
FIG. 4 is a perspective view of the supporting leg according to the present disclosure.
Figure 5:
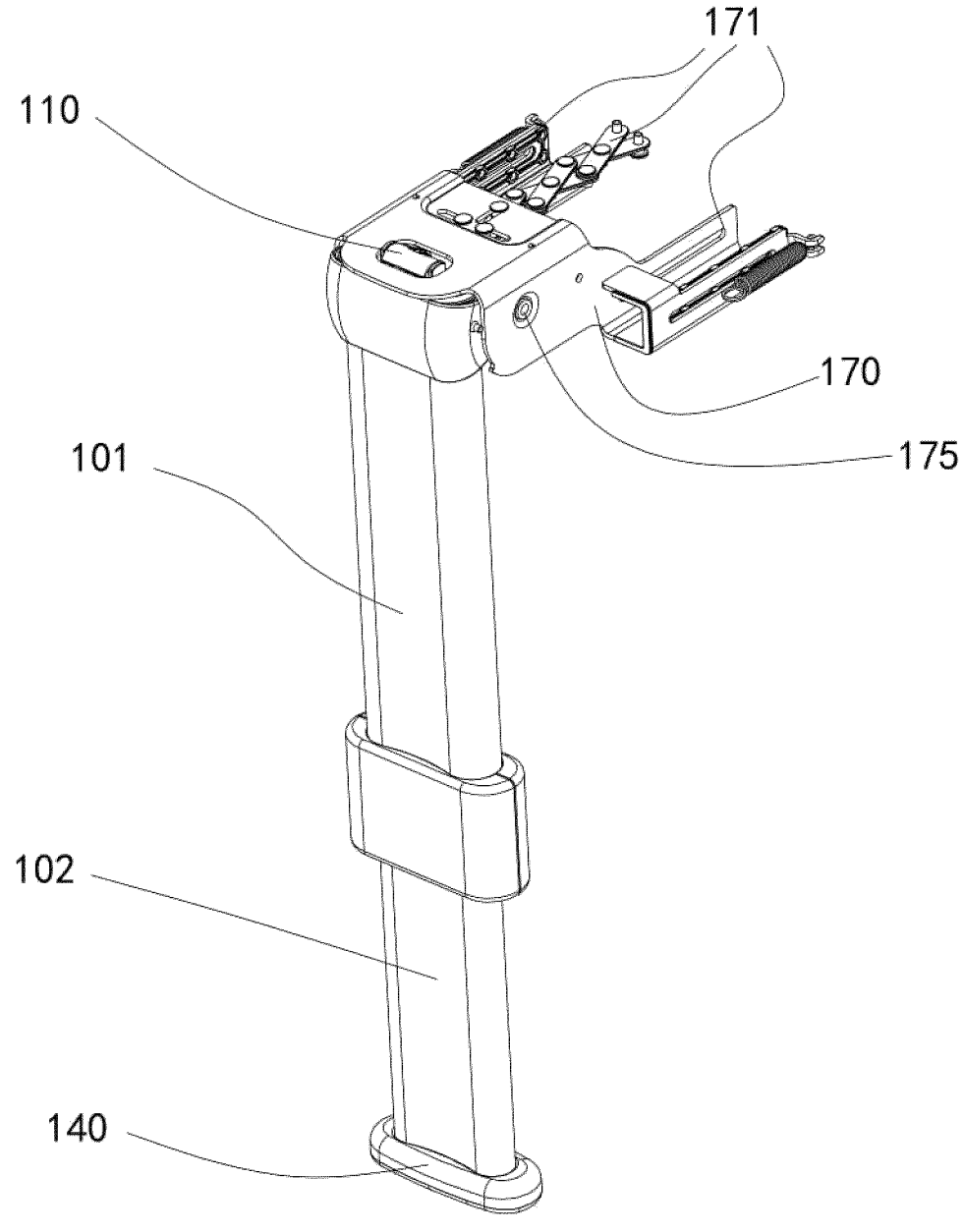
FIG. 5 is a perspective view of the supporting leg according to the present disclosure, in which a cover is removed to show a structure under the cover.

Referring to FIGS. 4-5, as shown, the bracket 170 for connecting the supporting leg 100 to the base 210 includes a sliding mechanism 171 and a supporting leg rotating shaft 175. The sliding mechanism 171 is a hinged connecting rod and/or a sliding rail, and a spring is provided on the sliding mechanism 171 to bias the supporting leg 100 towards a position under the base 210. A front end of the bracket 170 is provided with a supporting leg rotating shaft 175 extending in a left-right direction (i.e., transverse direction), and an upper end of the supporting leg 100 is mounted on the supporting leg rotating shaft 175 to allow the supporting leg 100 to rotate to a position under the base 210 as a whole (as shown in FIG. 3).

As shown in FIGS. 4-5, the indicator 110 of the indicating mechanism is exposed to the user through the hollow part or transparent window 166 on the cover 160, so as to be observed by the user.

Figure 6:
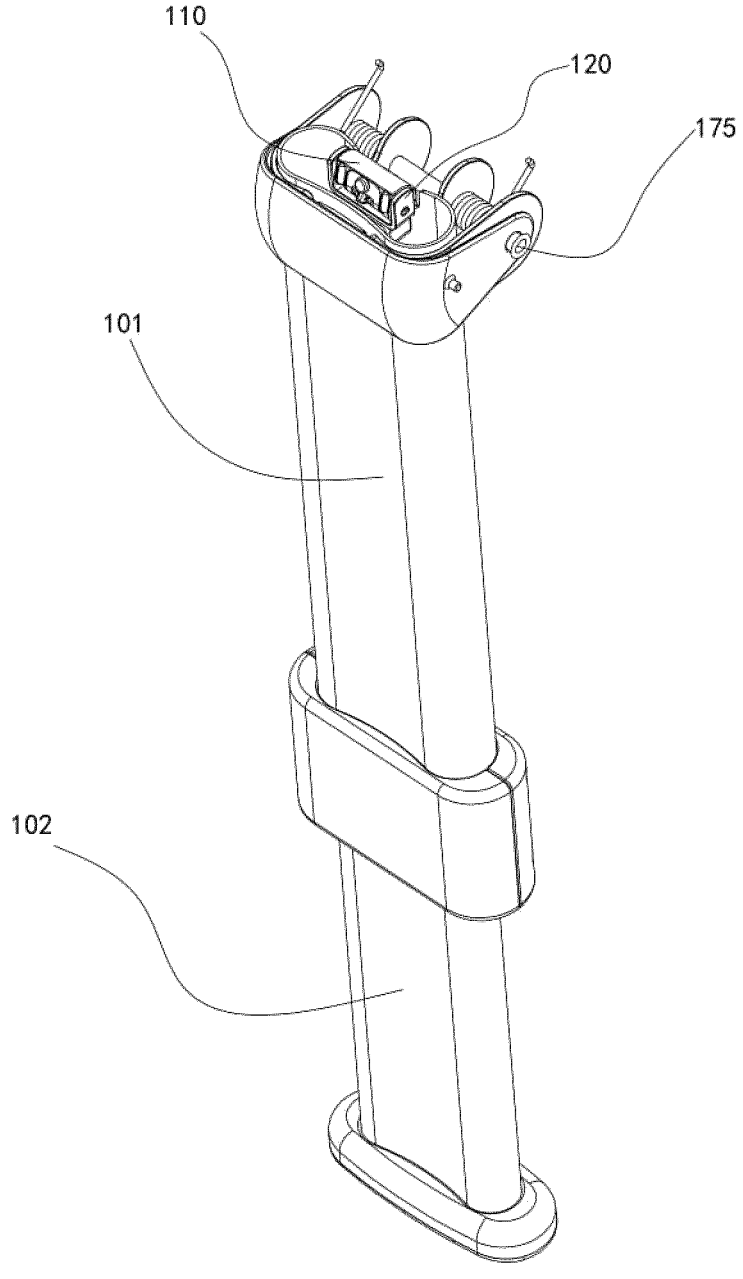
FIG. 6 is a perspective view of the supporting leg according to the present disclosure, in which the cover and a bracket are removed to show structures of other parts.
Figure 7:
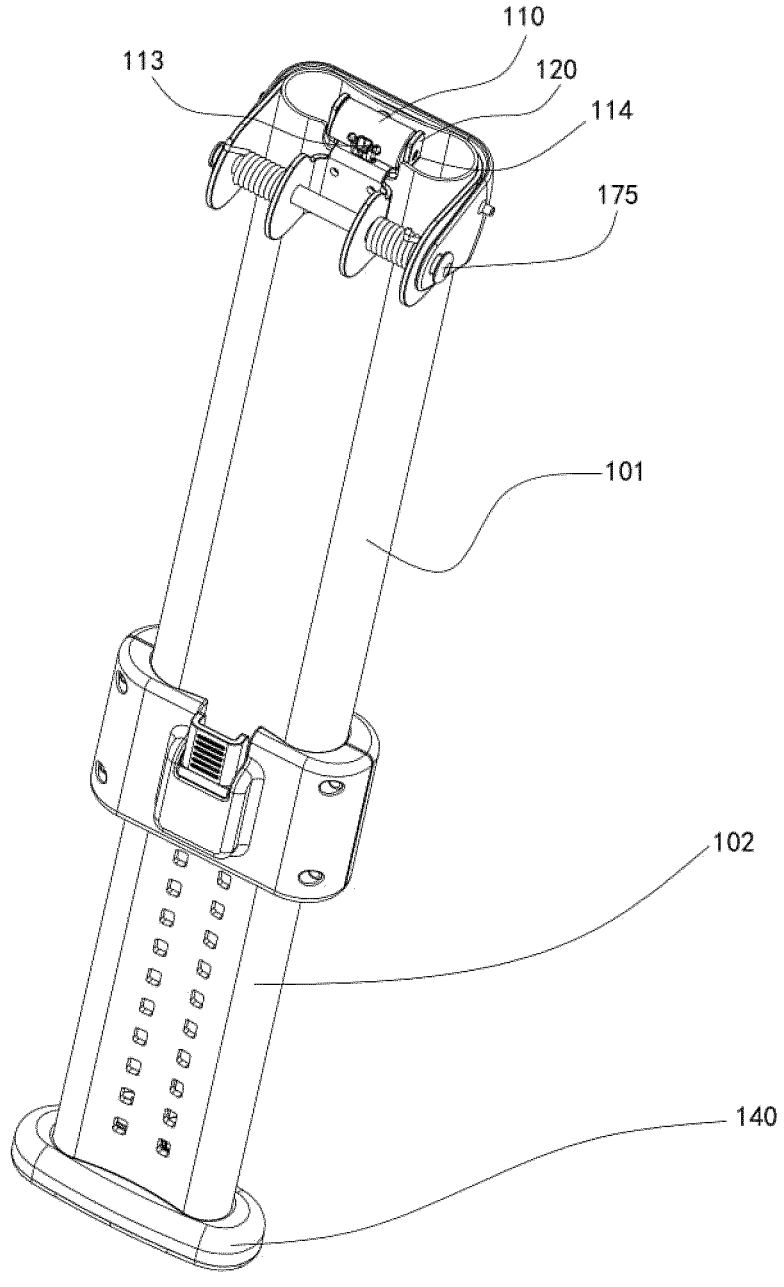
FIG. 7 is a perspective view from another angle corresponding to FIG. 6.
Figure 8:
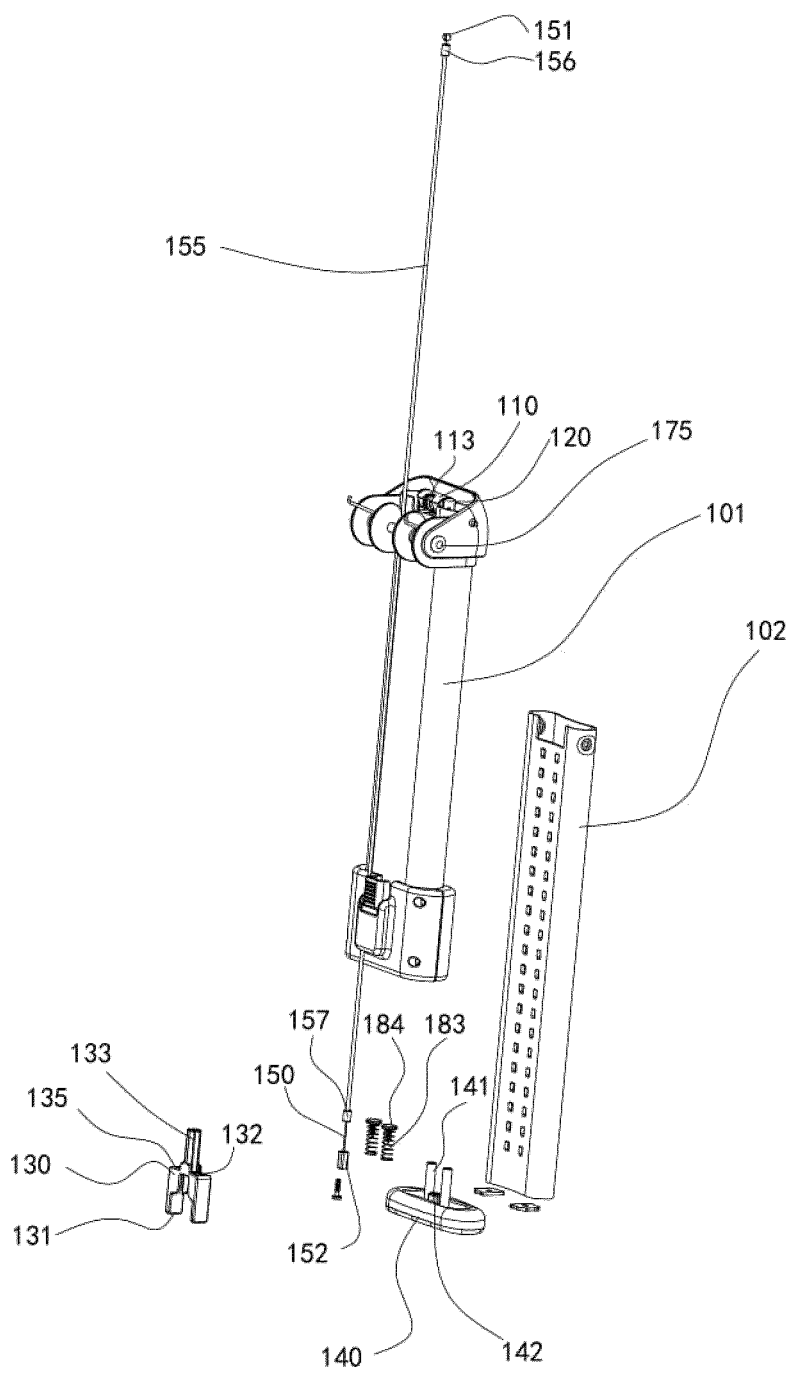
FIG. 8 is an exploded perspective view of the supporting leg according to the present disclosure.

Referring to FIGS. 6-8, the specific structure of the indicating mechanism according to the present disclosure and how it is mounted to the supporting leg 100 will be described below.

Figure 9A:
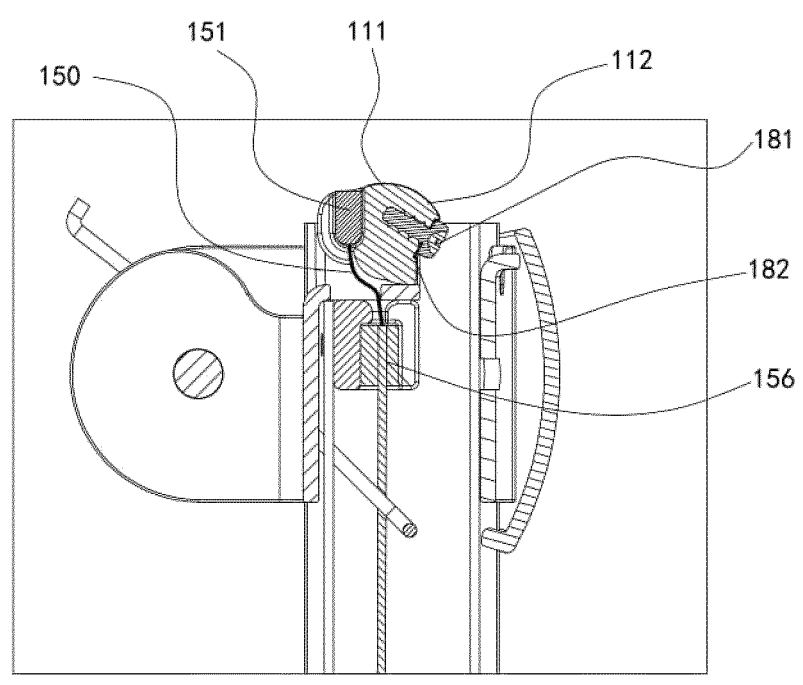
FIG. 9A is a longitudinal side cross-sectional view of an upper end of an indicating mechanism in an ungrounded state.
Figure 9B:
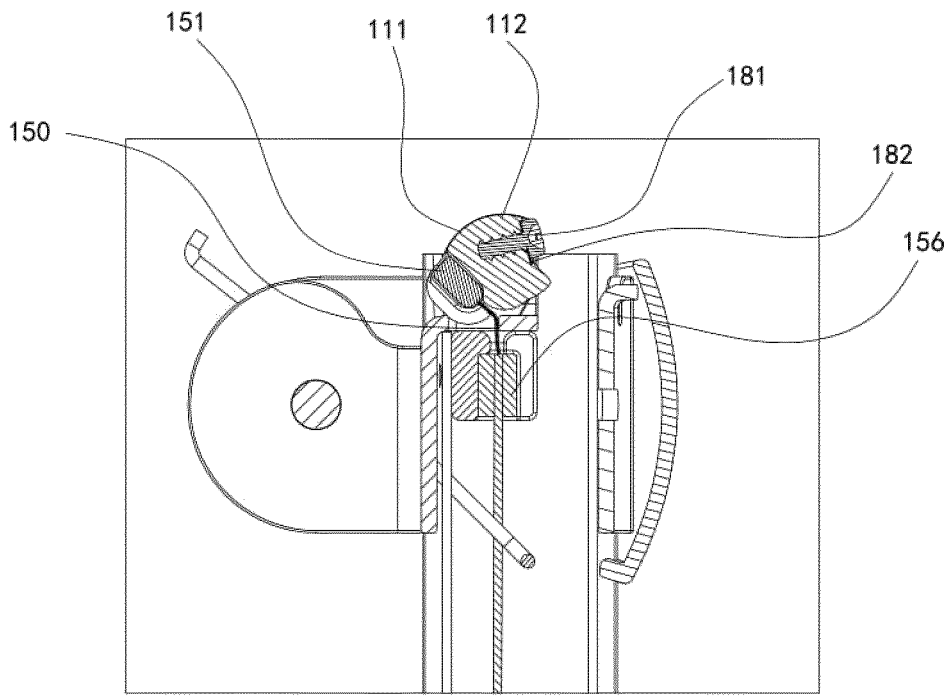
FIG. 9B is a longitudinal side cross-sectional view of the upper end of the indicating mechanism in a grounded state.

As shown, the indicating mechanism includes an indicator 110, a driver 130, a cable sleeve 155 and a cable 150. In some embodiments, the indicating mechanism further includes a mount 120, a first elastic element 182, a first screw 181 (as shown in FIGS. 9A and 9B), a second elastic element 183, and a second screw 184.

The indicator 110 is disposed at the indicating end of the supporting leg 100 through a transverse movable shaft 114, and rotates around the movable shaft 114 between a first position and a second position. For example, the first position corresponds to a position where the supporting leg does not contact with the ground, and the second position corresponds to a position where the supporting leg has contacted with the ground. In one embodiment, a first area 111 and a second area 112 are circumferentially arranged on a cylindrical periphery of the indicator 110 (see FIGS. 9A and 9B). When the supporting leg 100 is in an ungrounded position (i.e., the supporting leg does not contact with the ground), the first area 111 is exposed to the hollow part or the transparent window 166; and when the supporting leg 100 is in a grounded position (i.e., the supporting leg has contacted with the ground), the second area 112 is exposed to the hollow part or transparent window 166. For example, the first area 111 may be red and the second area 112 may be green, or the second area 111 and the second area 112 may be painted with different marks (such as dots, diagonal lines or other patterns) as long as they can be used to indicate whether the supporting leg 100 is grounded. The shapes of the first area 111 and the second area 112 may correspond to the shape of the hollow part or the transparent window 166. The embodiment of the present disclosure does not limit the form or color of the first area and the second area as mentioned above.

The movable shaft 114 can be directly disposed on the indicating end of the supporting leg 100, or can be mounted to the indicating end by the mount 120. For example, the movable shaft 114 is erected to two opposite upright walls of the mount 120, and the mount 120 is fixed to the indicating end. In the embodiment as shown, the supporting leg 100 is a hollow tubular component, and the mount 120 is fixed to an inner side of the indicating end, but the present disclosure is not limited thereto.

The first elastic element 182 is disposed between the indicator 110 and the first end 156 of the cable sleeve 155, and abuts against the indicator 110, for biasing the indicator 110 to the first position.

A first side of the indicator 110 is provided with a first accommodating part 113 for accommodating the first end 151 of the cable 150, and the first elastic element 182 and a second side of the indicator 110 abut against one end of the first elastic element 182. The other end of the first elastic element 182 is fixed to the indicating end. In one embodiment, the first side of the indicator 110 is opposite to the second side.

The driver 130 is at least partially disposed in the contacting end of the supporting leg 100, and includes a contacting part 131 extending vertically towards the outside of the contacting end. The driver 130 moves with respect to the contacting end between an extended position where the contacting part 131 extends out of the contacting end and a retracted position where the contacting part 131 retracts into the contacting end.

More specifically, the driver 130 includes a shoulder 135 and a hole 132. The shoulder 135 is located inside the contacting end of the supporting leg 100 and substantially extends transversely, and two contacting parts 131 extend out of the contacting end from both transverse ends of the shoulder 135 in a vertical direction. The hole 132 is opened on the shoulder 135, and the shoulder 135 is slidably sleeved on the column 141 extending inward from the bottom of the contacting end.

In one embodiment, a second elastic element 183 is provided between the driver 130 and the contacting end of the component, and the second elastic element 183 biases the driver 130 to the extended position. The second elastic element 183 can be a coil spring. The second elastic element 183 is sleeved on the column 141. One end of the second elastic element 183 abuts against an inner side of the second screw 184, and the other end abuts against the shoulder 135 to bias the driver 130 to the extended position. It should be understood that the arrangement of the second elastic element 183 is not limited thereto as long as the driver 130 is biased to the extended position.

The driver 130 further includes a mounting part (i.e., a second accommodating part 133) of that cable sleeve 155, which extends vertically inward from a center of the shoulder 135, is in a form of a groove and has a shape corresponding to the second end 157 of the cable sleeve for fixing the second end 157 of the cable sleeve. It should be understood that the form of the mounting part of the cable sleeve is not limited thereto, but can be changed according to the form of the second end of the cable sleeve.

The fixing seat 140 is a substantially flat component extending in transverse and longitudinal directions. In an embodiment where the fixing seat 140 is provided as a separate component, the lower end (contacting end) of the supporting leg 100 can be an open end, and the fixing seat 140 is used to close the open end. The column 141 and the third accommodating part 142 are provided on the inner side of the fixing seat 140. The fixing seat 140 is provided with a through hole, so that the contacting part 131 of the driver 130 extends out of the supporting leg 100. As mentioned above, the fixing seat 140 can be integrated into the supporting leg 100 as an integral part.

The cable sleeve 155 extends in a substantially vertical direction between the indicating end and the contacting end of the supporting leg 100. The cable sleeve 155 includes a first end 156 fixed to the indicating end and a second end 157 fixed to the driver 130. The cable sleeve 155 can be made of rubber or plastic, which has certain flexibility and is bendable, however, its length is substantially not changed.

In one embodiment, the first end 156 of the cable sleeve and the second end 157 of the cable sleeve are formed as a hammer with enlarged diameters at both ends. It should be understood that the first end 156 of the cable sleeve and the second end 157 of the cable sleeve can also be in other forms, such as external threads, elastic clamping elements, or being directly welded to the indicating end and the driver 130.

The cable 150 extends substantially vertically between the indicating end and the contacting end of the supporting leg 100, and is slidably sleeved in the cable sleeve 155. The cable 150 includes a first end 151 and a second end 152 extending out of both ends of the cable sleeve 155, wherein the first end 151 of the cable is fixed to the indicator 110 and drives the indicator 110 to rotate about the movable shaft 114, the second end 152 of the cable is fixed to the contacting end, and further, the second end 152 is fixedly connected to the base 140. The cable 150 is made of, for example, steel wire, nylon wire or carbon fiber, which has certain flexibility and is bendable, but its length is substantially not changed.

In one embodiment, the first end 151 and the second end 152 of the cable are formed as a hammer with enlarged diameters at both ends. It should be understood that the first end 151 and the second end 152 of the cable can also in other forms, such as external threads, knotting, or being directly welded to the indicating end and the contacting end.

The operation of the indicating mechanism of the present disclosure will be described with reference to FIGS. 9A to 10B.

Figure 10A:
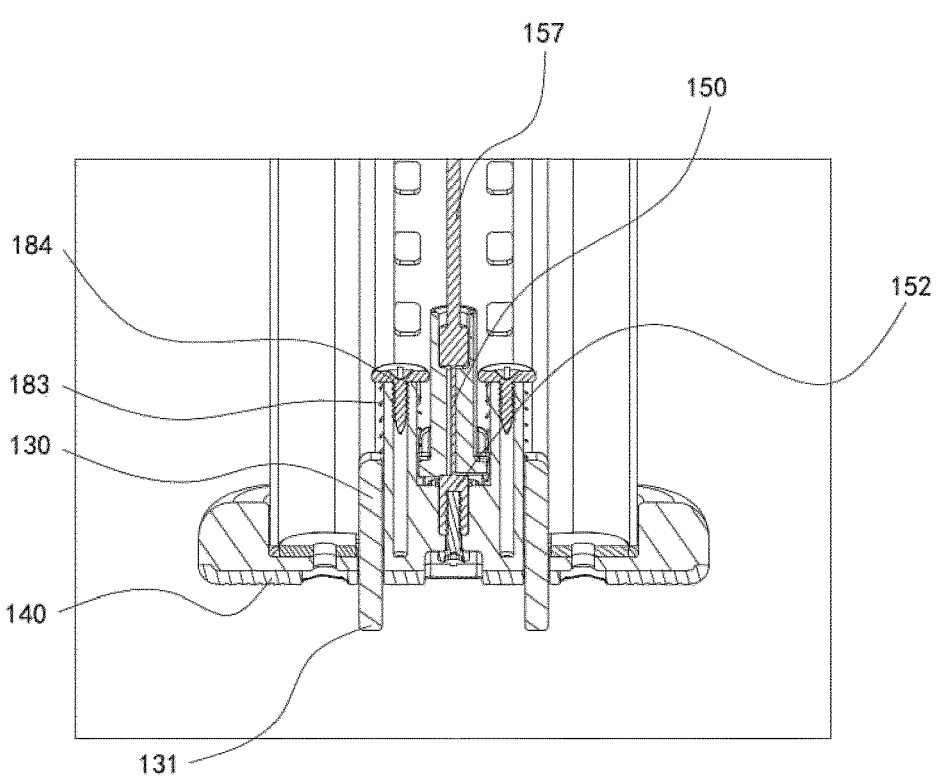
FIG. 10A is a longitudinal front cross-sectional view of a lower end of the indicating mechanism in the ungrounded state.

As shown in FIGS. 9A and 10A, the indicator 110 is in its first position and the driver 130 is in its extended position. The first area 111 of the indicator 110 faces upward (i.e., the position of the hollow part or the transparent window 166 on the cover 160) to indicate that the supporting leg 100 does not contact with the ground. Based on the biasing action of the first elastic element 182 and the second elastic element 183, the indicator 110 and the driver 130 tend to remain at the positions shown in FIGS. 9A and 10A without the influence of external forces.

Figure 10B:
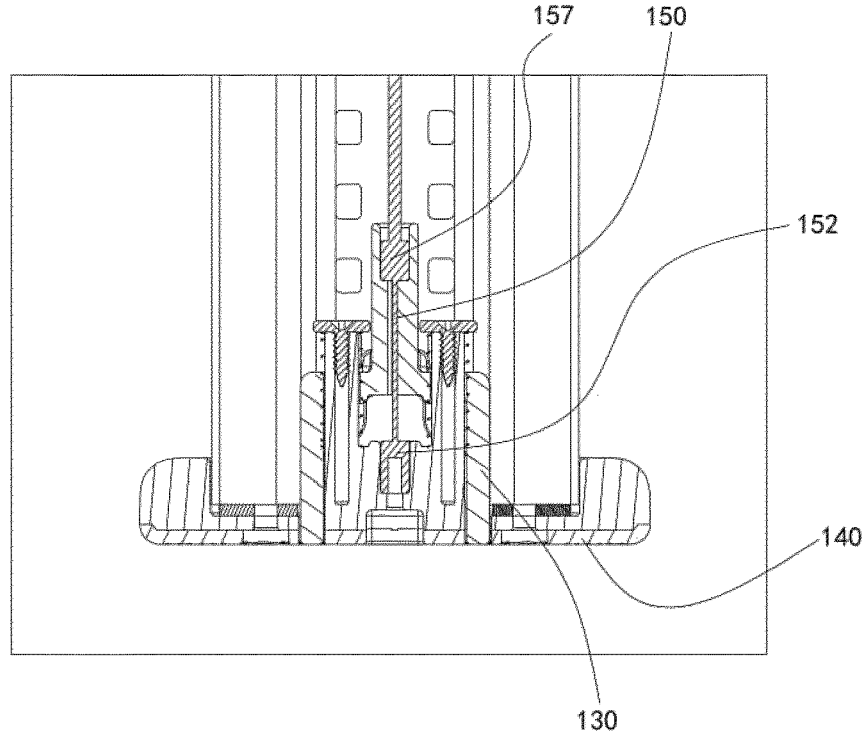
FIG. 10B is a longitudinal front cross-sectional view of the lower end of the indicating mechanism in the grounded state.

As shown in FIGS. 9B and 10B, the contacting end has contacted with the ground. The contacting part 131 of the driver 130 is exposed to the outside of the supporting leg 100, and thus receives a pressure from the ground and then moves to its retracted position against a biasing force of the second elastic element 183. Since the second end of the cable sleeve is fixed to the driver 130, the driver 130 drives the second end 157 of the movable cable sleeve away from the contacting end (i.e., moves upward). Meanwhile, since the second end 152 of the cable is fixed to the contacting end, the second end 152 of the cable does not move away from the contacting end, that is, does not move upward. In this way, it means that the second end 152 of the cable extends a certain length from the second end 157 of the cable sleeve. As mentioned above, lengths of the cable and the cable sleeve are substantially constant, that is, a length of a part of the cable 150 in the cable sleeve 155 is substantially constant. In this way, when the second end 152 of the cable extends a certain length out of the second end 157 of the cable sleeve, the first end 151 of the cable is retracted into the first end 156 of the cable sleeve by a corresponding length. The first end 156 of the cable sleeve is fixed to the indicating end of the supporting leg 100, so that the cable 150 slides towards the contacting end with respect to the cable sleeve 155, and then drives the indicator 110 to be rotated from its first position to its second position.

In other embodiments, the indicator 110 can be provided to move linearly instead of being rotated. For example, the indicator 110 is provided in the indicating end through a sliding rail, and slides between the second position and the first position. The indicator 110 is biased to the first position without external force. When the contacting end contacts with the surface, the cable 150 (specifically, the first end 151 of the cable) drives the indicator 110 to move to the second position against the biasing force. The sliding rail can be transversely arranged, so that a vertical movement of the cable 150 is converted into a transverse movement by pulleys at the indicating end. The sliding rail can also be vertically arranged, so that the hollow part or transparent window 166 is formed on a vertical surface of the cover 160.

Figures 11A, 11B:
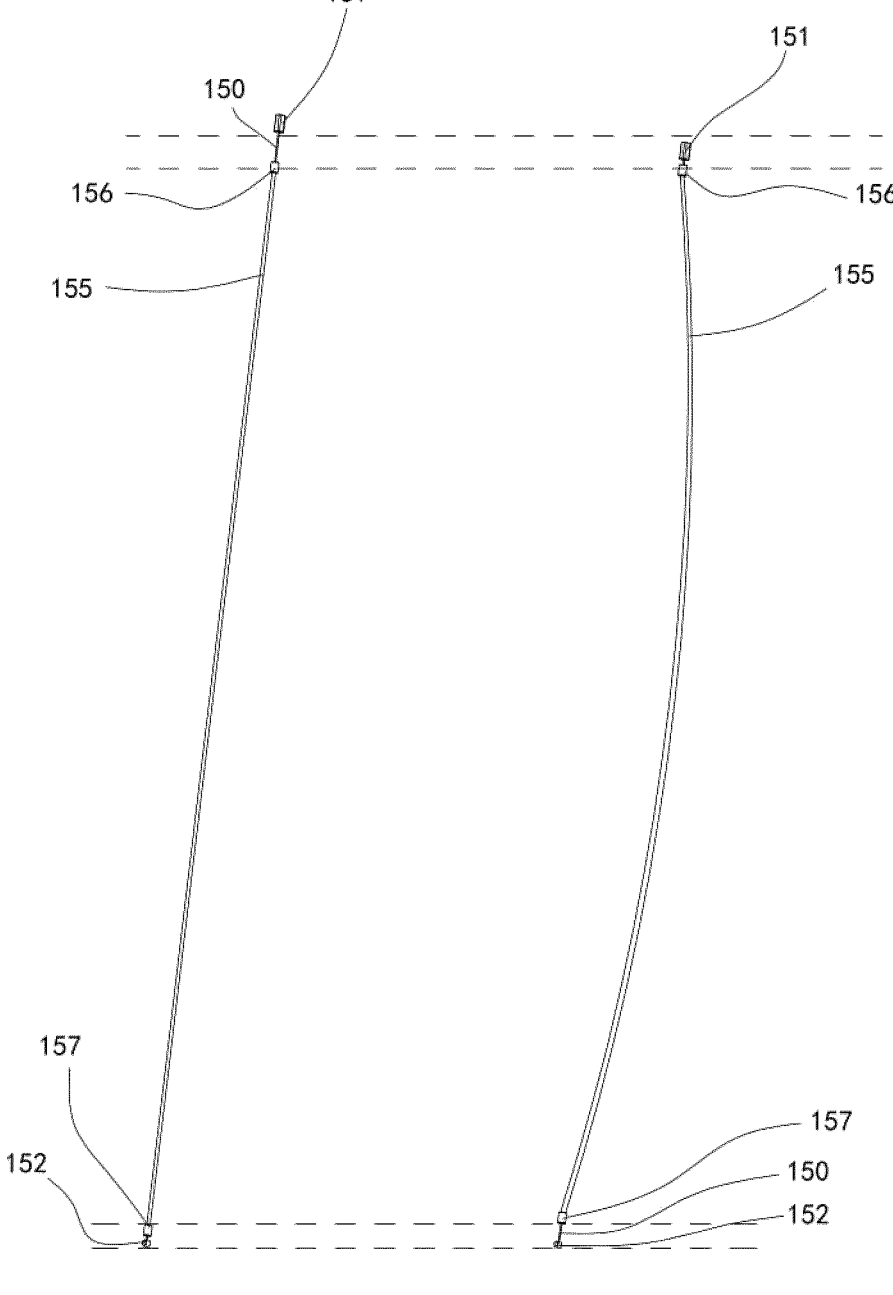
FIG. 11A is a schematic view of a cable and a cable sleeve in the ungrounded state.
FIG. 11B is a schematic view of the cable and the cable sleeve in the grounded state.

FIGS. 11A-11B provides an explanation of the technical principle of the present application. When the cable sleeve 155 is changed from a non-contact state shown in FIG. 11A to a contact state shown in FIG. 11B, the second end 157 of the cable sleeve is pushed upward, but the first end 156 of the cable sleeve is fixed, so that the cable sleeve 155 is bent (a degree of bending is exaggerated in the figure). As the cable 150 is sleeved in the cable sleeve 155 and must extend along a curved path of the cable sleeve 155, an extending path of the cable 150 from the indicating end to the contacting end is actually lengthened. As the second end 152 of the cable is fixed to the contacting end, the first end 151 of the cable is forced to be retracted inward.

Although it is shown in FIG. 11A that the cable sleeve 155 and the cable 150 extend substantially along a straight line, it should be understood that it is not necessary for the cable sleeve 155 and the cable 150 to extend linearly in the non-contact state. In practice, the cable sleeve 155 and the cable 150 can also be bent in the non-contact state, and bent to a greater extent in the contact state, which can also realize their functions. The advantage of this characteristic is that the cable 150 and the cable sleeve 155 can be adapted to the supporting legs 100 with various lengths. For example, the lengths of the cable 150 and the cable sleeve 155 can be designed to correspond to the maximum length of the supporting leg 100, and when the supporting leg 100 is adjusted to be shortened, the cable 150 and the cable sleeve 155 are connected between two ends of the supporting leg 100 in a curved manner, and the function of indicating contact can still be realized.

In one embodiment, the driver is at least partially exposed from the contacting end and includes a contacting part extending to outside of the contacting end, and the driver is movable between an extended position and a retracted position with respect to the contacting end, wherein when the contacting end contacts with the surface, the driver correspondingly moves from the extended position to the retracted position, driving the second end of the cable sleeve away from the contacting end.

In one embodiment, the indicating end also includes a first elastic element, which is arranged between the indicator and the first end of the cable sleeve, abutting against the indicator, for biasing the indicator to the first position.

In one embodiment, a first accommodating part for accommodating the first end of the cable is provided on a first side of the indicator, a first elastic element and a second side of the indicator abut against one end of the first elastic element, and the other end of the first elastic element is fixed to the indicating end of the component, wherein the first side is opposite to the second side.

In one embodiment, the indicating end is provided with a movable shaft or a sliding rail, and the indicator is rotated between the first position and the second position through the movable shaft or slides between the first position and the second position through the sliding rail.

In one embodiment, the indicator includes a first area and a second area, and when the component does not contact with the surface, the first area is exposed from a hollow part or a transparent window of the indicating mechanism; and when the component has contacted with the surface, the second area is exposed from the hollow part or the transparent window.

In one embodiment, a second elastic element is provided between the driver and the contacting end of the component, and the second elastic element biases the driver to the extended position.

In one embodiment, the driver includes a shoulder substantially extending transversely, and two contacting parts extend out of the contacting end from both transverse ends of the shoulder in a vertical direction. The shoulder is provided with a hole, which can be sleeved on a column at a bottom of the contacting end, and the second elastic element is sleeved on the column. The second elastic element is arranged between the column and the shoulder to bias the driver to the extended position.

In one embodiment, the driver also includes a second accommodating part extending inward from a center of the shoulder in the vertical direction. The second accommodating part is in a form of a groove and has a shape corresponding to the second end of the cable sleeve for fixing the second end of the cable sleeve.

In one embodiment, each of the first end of the cable, the second end of the cable, the first end of the cable sleeve, and the second end of the cable sleeve is in a form of a hammer with an enlarged diameter at its terminal.

In one embodiment, the cable is a steel wire.

In one embodiment, the first position of the indicator corresponds to a state in which the component does not contact with the surface, and the second position of the indicator corresponds to a state in which the component has contacted with the surface.

A supporting leg for supporting a carrier to a surface according to the present disclosure is provided. The supporting leg includes an indicating mechanism according to the present disclosure, wherein the component is the supporting leg, and the surface is an interior floor of a vehicle, and the supporting leg is connected to a base of the carrier at the indicating end thereof.

In one embodiment, the supporting leg includes a cover covering the indicating end of the supporting leg, and a hollow part or a transparent window is provided on a top surface of the cover to show the indicator.

In one embodiment, the supporting leg is connected to the base of the carrier through a bracket, and the bracket is connected to the base through a sliding mechanism capable of sliding in a longitudinal direction, so as to allow the supporting leg to slide to a position under a bottom side of the base and slide out of the base.

In one embodiment, a cover indicating part is provided on an outer surface of the cover, the cover indicating part is observable by a user when the supporting leg slides out from a position under the base, and cannot be observed by the user when the supporting leg slides into the position under the base.

In one embodiment, the supporting leg is connected to the bracket through a rotating shaft, and when the supporting leg slides into a position under the base, the supporting leg is rotatable about the supporting leg rotating shaft to a lower side of the base.

In one embodiment, the supporting leg includes an upper tube having the indicating end and a lower tube having the contacting end, and the upper tube is sleeved onto the lower tube and provided with a corresponding positioning device to allow the overall length of the supporting leg to be adjusted.

A carrier according to the present disclosure is provided. The carrier includes a base; a seat carried by the base; the supporting leg according to the present disclosure installed under the base for supporting the base.

In one embodiment, the carrier is a child safety seat that can be mounted on a vehicle seat.

As described above, the present disclosure provides an indicating mechanism, which intuitively indicates whether one end of the supporting leg is grounded on the other end of the supporting leg. Furthermore, the indicating mechanism of the present disclosure allows the length of the supporting leg to be changed, and also achieves its contact indicating function. It should be understood that although the supporting leg is shown in the embodiments, the indicating mechanism of the present disclosure can be applied to various parts of various shapes.

The present disclosure also provides a supporting leg, which is provided with an indicating mechanism and an extension indicating mechanism, and can prompt a user about an extended state and a grounded state of the supporting leg.

The present disclosure also provides a carrier, which is provided with the supporting leg according to the present disclosure, and the supporting leg can be folded and retracted back to a position under a base of the carrier.

Although preferred embodiments have been shown and described herein, it should be understood that these embodiments are only given as examples. Many modifications, changes and substitutions will be conceived by those skilled in the art without departing from the spirit of the present disclosure. Therefore, the appended claims are intended to cover all such modifications that fall within the spirit and scope of the present disclosure.

What is claimed is:

1. An assembly comprising:
a component; and
an indicating mechanism for indicating whether the component contacts with a surface,
wherein the component has an indicating end and a contacting end that are vertically opposite to each other,
wherein the indicating mechanism is installed on the component and comprises:
an indicator disposed at the indicating end and movable between a first position and a second position to indicate whether the component contacts with the surface;
a driver movably disposed in the contacting end;
a cable sleeve comprising a first end fixed to the indicating end and a second end fixed to the driver;
a cable movably arranged in the cable sleeve, and comprising a first end and a second end extending out of both ends of the cable sleeve, wherein the first end of the cable is fixed to the indicator and drives the indicator to move, and the second end of the cable is fixed to the contacting end, and
wherein, when the component contacts with the surface, the driver drives the second end of the cable sleeve away from the contacting end, so that the cable moves towards the contacting end with respect to the cable sleeve, and drives the indicator to move.

2. The assembly according to claim 1, wherein:
the driver is at least partially exposed from the contacting end, and the driver comprises a contacting part extending to outside of the contacting end, wherein the driver is movable between an extended position and a retracted position with respect to the contacting end, wherein, when the contacting end contacts with the surface, the driver correspondingly moves from the extended position to the retracted position, driving the second end of the cable sleeve away from the contacting end.

3. The assembly according to claim 2, wherein:
the indicator comprises a first area and a second area, and when the component does not contact with the surface, the first area is exposed from a hollow part or a transparent window of the indicating mechanism; and when the component has contacted with the surface, the second area is exposed from the hollow part or the transparent window.

4. The assembly according to claim 1, wherein:
a first accommodating part for accommodating the first end of the cable is provided on a first side of the indicator, a first elastic element and a second side of the indicator abut against one end of the first elastic element, and the other end of the first elastic element is fixed to the indicating end of the component, wherein the first side is opposite to the second side.

5. The assembly according to claim 1, wherein:
the indicating end is provided with a movable shaft or a sliding rail, and the indicator is rotated between the first position and the second position through the movable shaft or slides between the first position and the second position through the sliding rail.

6. The assembly according to claim 1, wherein:
the indicating end further comprises a first elastic element arranged between the indicator and the first end of the cable sleeve, abutting against the indicator, for biasing the indicator to the first position.

7. The assembly according to claim 3, wherein a second elastic element is provided between the driver and the contacting end of the component, and the second elastic element biases the driver to the extended position.

8. The assembly according to claim 7, wherein:
the driver comprises a shoulder substantially extending transversely, and two contacting parts extend out of the contacting end from both transverse ends of the shoulder in a vertical direction,
the shoulder is provided with a hole sleeved on a column at a bottom of the contacting end, and the second elastic element is sleeved on the column and arranged between the column and the shoulder to bias the driver to the extended position.

9. The assembly according to claim 8, wherein:
the driver further comprises a second accommodating part extending inward from a center of the shoulder in the vertical direction, wherein the second accommodating part is in a form of a groove and has a shape corresponding to the second end of the cable sleeve for fixing the second end of the cable sleeve.

10. The assembly according to claim 1, wherein:
each of the first end of the cable, the second end of the cable, the first end of the cable sleeve, and the second end of the cable sleeve is in a form of a hammer with an enlarged diameter at its terminal.

11. The assembly according to claim 1, wherein the cable is a steel wire.

12. The assembly according to claim 1, wherein:
the first position of the indicator corresponds to a state in which the component does not contact with the surface, and the second position of the indicator corresponds to a state in which the component has contacted with the surface.

13. The assembly according to claim 1,
wherein the component is a supporting leg configured to support a carrier to a surface,
wherein the surface is an interior floor of a vehicle, wherein the supporting leg is configured to be connected to a base of the carrier at the indicating end thereof,
wherein the supporting leg comprises a cover covering the indicating end of the supporting leg, and
wherein a hollow part or a transparent window is provided on a top surface of the cover to show the indicator.

14. The assembly according to claim 13, wherein:
the supporting leg is connected to the base of the carrier through a bracket, and the bracket is connected to the base through a sliding mechanism capable of sliding in a longitudinal direction to allow the supporting leg to slide into a position under a bottom side of the base and slide out of the base.

15. The assembly according to claim 14, wherein:
a cover indicating part is provided on an outer surface of the cover, wherein the cover indicating part is observable when the supporting leg slides out from a position under the base, and the cover indicating part is not observable when the supporting leg slides into the position under the base.

16. The assembly according to claim 14, wherein:
the supporting leg is connected to the bracket through a rotating shaft, and when the supporting leg slides into a position under the base, the supporting leg is rotatable about the rotating shaft to a lower side of the base.

17. The assembly according to claim 13, wherein:
the supporting leg comprises an upper tube having the indicating end and a supporting leg lower tube having the contacting end, and the upper tube is sleeved onto the supporting leg lower tube and provided with a corresponding positioning device to allow an overall length of the supporting leg to be adjusted.

18. A carrier, wherein the carrier comprises:
a base;
a seat carried by the base;
the assembly according to claim 13 installed under the base for supporting the base.

19. The carrier according to claim 18, wherein the carrier is a child safety seat that is mounted on a vehicle seat.

* * * * *